United States Patent
Hane

(10) Patent No.: US 8,513,936 B2
(45) Date of Patent: Aug. 20, 2013

(54) SWITCHING POWER SUPPLY CIRCUIT

(75) Inventor: Norimasa Hane, Tokyo (JP)

(73) Assignee: Torex Semiconductor Ltd., Tokyo (JP)

(*) Notice: Subject to any disclaimer, the term of this patent is extended or adjusted under 35 U.S.C. 154(b) by 108 days.

(21) Appl. No.: 13/033,821

(22) Filed: Feb. 24, 2011

(65) Prior Publication Data

US 2011/0204867 A1    Aug. 25, 2011

(30) Foreign Application Priority Data

Feb. 25, 2010    (JP) .................................. 2010-040782

(51) Int. Cl.
*G05F 1/00*    (2006.01)

(52) U.S. Cl.
USPC ........................................................ 323/288

(58) Field of Classification Search
USPC ................................. 323/288, 285
See application file for complete search history.

(56) References Cited

U.S. PATENT DOCUMENTS

| 7,595,620 | B2 | 9/2009 | Sakai et al. | |
|---|---|---|---|---|
| 7,800,352 | B2* | 9/2010 | Qiu et al. | 323/285 |
| 2004/0135564 | A1* | 7/2004 | Huang et al. | 323/282 |
| 2007/0182395 | A1* | 8/2007 | Sakai et al. | 323/283 |
| 2008/0238396 | A1* | 10/2008 | Ng et al. | 323/284 |
| 2010/0066328 | A1* | 3/2010 | Shimizu et al. | 323/282 |

FOREIGN PATENT DOCUMENTS

JP    2006141191 A    6/2006

* cited by examiner

*Primary Examiner* — Jue Zhang
(74) *Attorney, Agent, or Firm* — The Webb Law Firm

(57) ABSTRACT

A switching power supply circuit includes: a comparator for comparing a reference voltage, which is an output signal of a reference voltage generation circuit, with a feedback voltage, and outputting a set signal when a difference between the reference voltage and the feedback voltage exceeds a predetermined threshold value; an ON-time generation circuit for generating an ON-time signal for defining a period of time during which a switching element is kept ON; and a flip-flop circuit which turns on or off the switching element by the set signal and turns off or on the switching element by the ON-time signal. The reference voltage generation circuit has a first reference power supply for generating a first reference voltage, a second reference power supply for generating a second reference voltage, a capacitor, a resistor, and switch means.

5 Claims, 8 Drawing Sheets

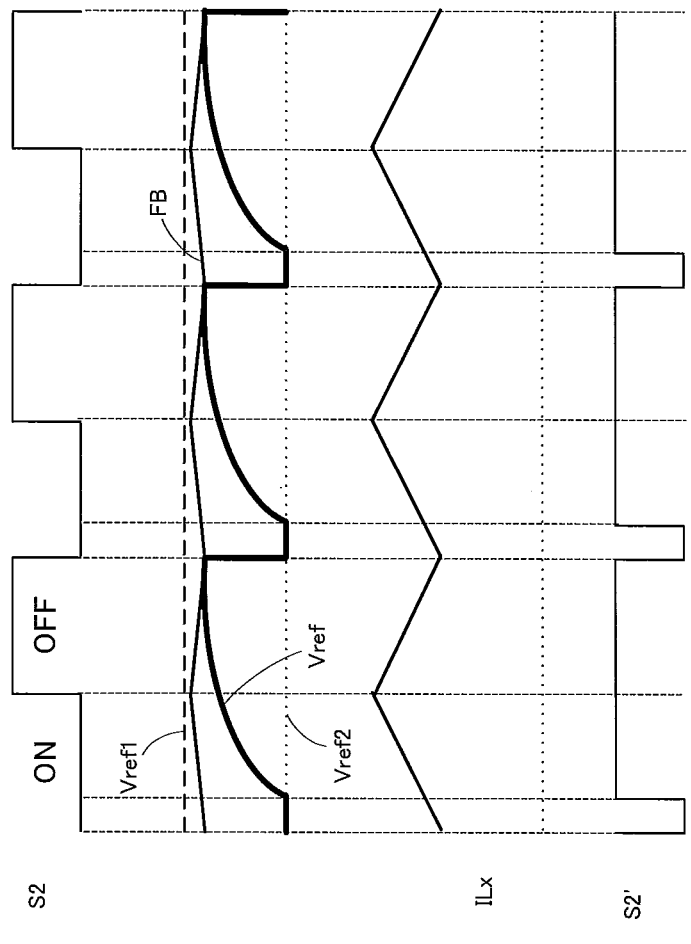

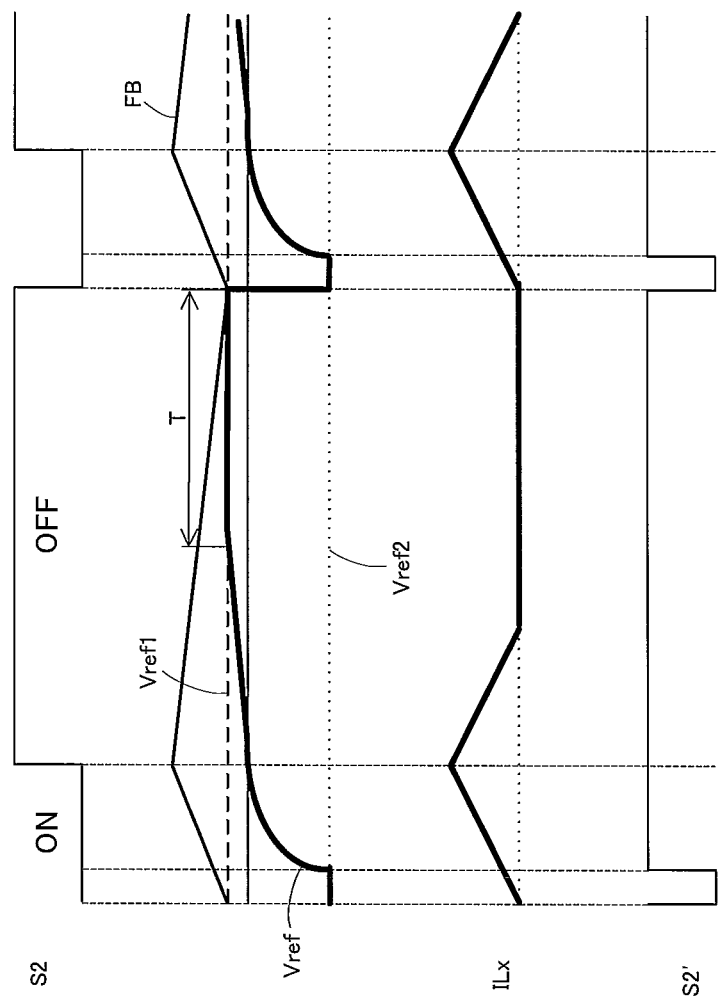

PRIOR ART

SWITCHING POWER SUPPLY CIRCUIT

The entire disclosure of Japanese Patent Application No. 2010-040782 filed Feb. 25, 2010 is expressly incorporated by reference herein.

TECHNICAL FIELD

This invention relates to a switching power supply circuit and, more specifically, to that useful when applied in performing PFM control which is designed to adjust an output voltage by turning on or off a switching element with the use of the output of a flip-flop circuit.

BACKGROUND ART

As a switching power supply circuit capable of a high speed action, a proposal has been made for the one configured to adjust an output voltage by turning on or off a switching element with the use of the output of a flip-flop circuit, as shown in FIG. 7. As shown in this drawing, this switching power supply circuit is equipped with a comparator 1 which compares a feedback voltage FB based on an output voltage VOUT (i.e., a voltage obtained by dividing the output voltage VOUT by a resistance ratio between the resistances of feedback resistors RFB1 and RFB2) with a reference voltage Vref as the output voltage of a reference power supply V0; a flip-flop circuit 2 which is set by the output of the comparator 1; and an ON-time generation circuit 3 which resets the flip-flop circuit 2 at a time when a predetermined time elapses after an output signal from the flip-flop circuit 2 has fallen. The output signal of the flip-flop circuit 2 is supplied to a switching element (in the present example, a P-channel MOSFET) SW via a buffer circuit 4, whereby the switching element SW is turned on or off. In this manner, the output voltage VOUT is obtained which is a predetermined direct current voltage smoothed by a capacitor CL via a coil L connected between a drain of the switching element SW and a free-wheeling or flywheel diode D.

In the above-mentioned switching power supply circuit, when a pulse signal supplied from an output terminal Q_B of the flip-flop circuit 2 to the switching element SW via the buffer circuit 4 is at an L-level, the switching element SW enters the ON-state. Thus, a coil current ILx flowing through the coil L gradually increases.

When, in this state, an ON-time defined by the ON-time generation circuit 3 has passed, the flip-flop circuit 2 is reset by an ON-time signal outputted from the ON-time generation circuit 3. As a result, the pulse signal supplied from the output terminal Q_B to the switching element SW via the buffer circuit 4 reaches an H-level, and the switching element SW enters the OFF-state. Consequently, the coil current ILx gradually decreases while being bypassed or recirculating via the diode D.

As the coil current ILx decreases, the output voltage VOUT becomes less than the reference voltage Vref. At this time, the flip-flop circuit 2 is set, with the result that the switching element SW enters the ON-state. Consequently, the coil current ILx gradually increases again. Simultaneously, the management or control of the ON-time by the ON-time generation circuit 3 is started. Afterwards, the same actions are repeated.

In FIG. 7, VIN denotes an input voltage, and CFB denotes a speed-up capacitor. A switching power supply circuit similar to that in FIG. 7, is disclosed in Japanese Patent Document JPA-2006-141191.

In the switching power supply circuit according to the conventional technology, as described above, the feedback voltage FB is compared with the reference voltage Vref by the comparator 1, and the flip-flop circuit 2 is set by the output of this comparator 1. By this measure, the on-off control of the switching element SW is exercised. If the ripple component of the output voltage VOUT is small, therefore, switching control in the flip-flop circuit 2 becomes unstable. That is, if the ripple component of the output voltage VOUT is small, the difference of the feedback voltage FB from the reference voltage Vref does not reach a sufficient level. As a result, the timing of setting of the flip-flop circuit 2 deviates from the position on the time base where it should be located. In synchronism with this deviating timing, the following timings also deviate: the timings of the rise and fall of the pulse signal supplied from the output terminal Q_B to the switching element SW via the buffer circuit 4, and the timing of the rise of the ON-time signal fed out via the ON-time generation circuit 3. Consequently, the output voltage VOUT becomes so unstable as to involve undulations or the like.

Such phenomena are more manifest in a case where a capacitor with low ESR (equivalent series resistance) is used as the capacitor CL, or when the switching frequency is increased.

The present invention has been accomplished in the light of the above-mentioned earlier technology. It is an object of the present invention to provide a switching power supply circuit which can be allowed to act stably even when a capacitor with low ESR is used or when the switching frequency becomes high.

SUMMARY OF THE INVENTION

A first aspect of the present invention for attaining the above object is a switching power supply circuit including a switching element and a free-wheeling element and adapted to turn on or off at least the switching element, thereby converting a direct current input voltage into a direct current output voltage, comprising: a comparator for comparing a reference voltage, which is an output signal of a reference voltage generation circuit, with a feedback voltage based on the output voltage, and outputting a set signal when a difference between the reference voltage and the feedback voltage exceeds a predetermined threshold value; an ON-time generation circuit for generating an ON-time signal being a pulse signal for defining a period of time during which the switching element is kept ON; and a flip-flop circuit which is set by the set signal to bring the switching element into an ON-state or an OFF-state, and is reset by the ON-time signal to bring the switching element into an OFF-state or an ON-state, and wherein the reference voltage generation circuit has a first reference power supply for generating a first reference voltage, a second reference power supply for generating a second reference voltage lower than the first reference voltage, a capacitor having one electrode side connected to one input terminal of the comparator so that a capacitor voltage thereof becomes the reference voltage, a resistor connected between the first reference power supply and the one electrode side of the capacitor, and switch means connected between the second reference power supply and the one electrode side of the capacitor, and the reference voltage generation circuit is controlled such that at least during an OFF-period of the switching element, the switch means is brought into an OFF-state, and the reference voltage is gradually increased.

A second aspect of the present invention is the switching power supply circuit according to the first aspect, wherein the switch means is controlled so as to be turned on or off in synchronization with turning-on or turning-off of the switching element.

A third aspect of the present invention is the switching power supply circuit according to the first aspect, wherein the switch means is controlled so as to be turned on simultaneously with turning-on of the switching element and be turned off a predetermined period of time after the turning-on of the switching element.

A fourth aspect of the present invention is the switching power supply circuit according to any one of the first to third aspects, further comprising the switching element, and a freewheeling diode for flowing an electric current when the switching element is in the OFF-state.

A fifth aspect of the present invention is the switching power supply circuit according to any one of the first to third aspects, further comprising a main switching element and a subordinate switching element, and adapted to exercise switching control in a synchronous rectification mode for alternately turning on and off the main switching element and the subordinate switching element according to an output of the flip-flop circuit.

According to the present invention, the comparator compares the feedback voltage with the reference voltage which is defined by a time constant based on the resistance value of the resistor and the capacity of the capacitor and gradually increases from the second reference voltage toward the first reference voltage, beginning at a time when the switch means is brought into the OFF-state. Based on this comparison, the comparator forms the set signal. Thus, a state equivalent to a state where the ripple component of the output voltage is sufficiently great can be created. Consequently, even if the ripple component of the output voltage becomes small by use of a smoothing capacitor with low ESR, or even if the slew rate of the ripple component of the output voltage becomes relatively small as a result of an increase in the switching frequency, a predetermined switching action can be performed stably.

Moreover, the reference voltage is a voltage which gradually increases from the second reference voltage toward the first reference voltage, so that the first reference voltage constitutes its upper limit. Consequently, the upper limit of the output voltage is also defined by the first reference voltage, and is not inadvertently increased. A direct current voltage adjusted to a value within a predetermined range can be obtained stably. That is, the amplitude of the reference voltage in the present invention is uniquely defined between the second reference voltage and the first reference voltage by a time constant based on the resistance value of the resistor and the capacity of the capacitor. As a result, the management or control of the amplitude of the reference voltage can be performed unerringly and easily.

BRIEF DESCRIPTION OF DRAWINGS

FIG. 5 is a wave form chart showing the signal waveforms of the respective portions in FIG. 1 in a continuous mode of a switching power supply circuit according to other embodiment of the present invention.

FIG. 6 is a waveform chart showing the signal waveforms of the respective portions in FIG. 1 in a discontinuous mode of the switching power supply circuit according to the other embodiment of the present invention.

DESCRIPTION OF EMBODIMENTS

The embodiment of the present invention will now be described in detail with reference to the accompanying drawings.

Figure 1:
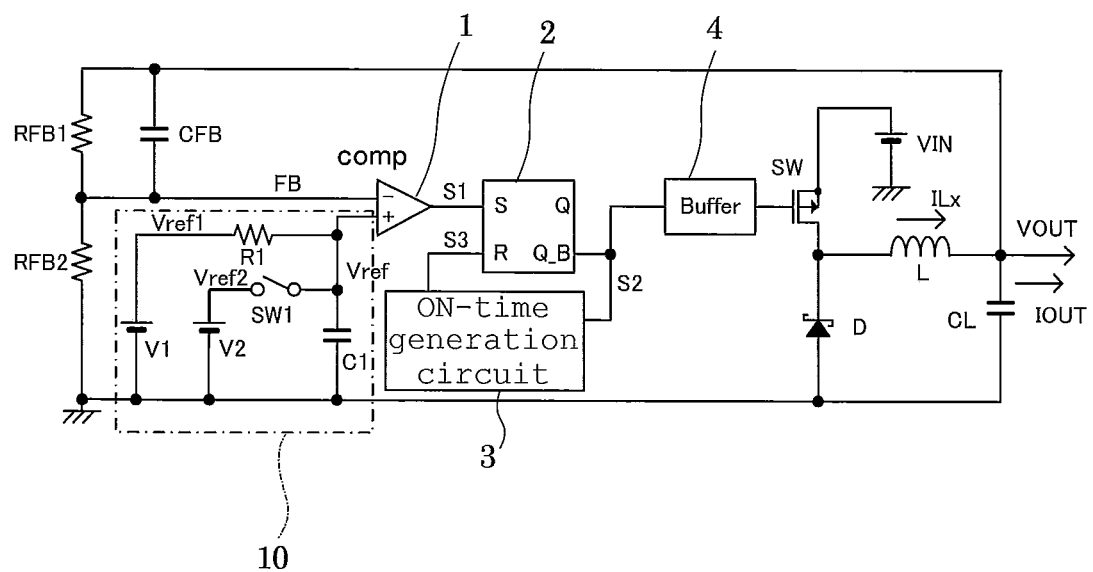
FIG. 1 is a block diagram showing a switching power supply circuit according to an embodiment of the present invention.
Figure 7:
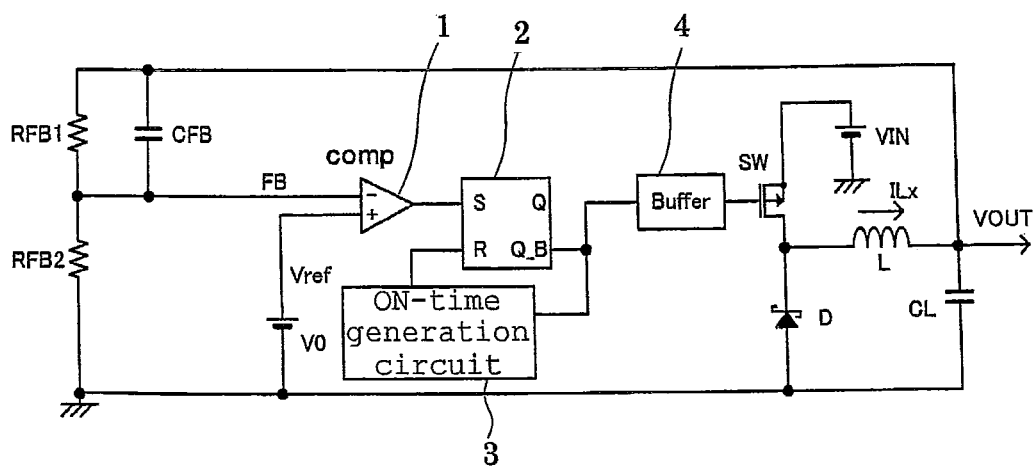
FIG. 7 is a block diagram showing a switching power supply circuit according to the conventional technology.

FIG. 1 is a block diagram showing a switching power supply circuit according to the embodiment of the present invention. As shown in this drawing, the switching power supply circuit according to the present embodiment is configured such that the reference voltage Vref of the switching power supply circuit according to the conventional technology shown in FIG. 7 is generated by a reference voltage generation circuit 10. That is, the switching power supply circuit according to the present embodiment has the reference voltage generation circuit 10 in addition to the comparator 1, the flip-flop circuit 2, and the ON-time generation circuit 3. This switching power supply circuit turns the switching element SW on or off to convert the direct current input voltage VIN into the direct current output voltage VOUT. The comparator 1 has a noninverting input terminal to which the reference voltage Vref, the output signal of the reference voltage generation circuit 10, is applied. The comparator 1 also has an inverting input terminal to which the feedback voltage FB obtained by dividing the output voltage VOUT by the ratio between the resistances of the feedback resistors RFB1 and RFB2 is applied. Thus, the comparator 1 compares the reference voltage Vref with the feedback voltage and, when the difference between them exceeds a predetermined threshold value, outputs a set signal S1. The flip-flop circuit 2 is set by the set signal S1 to turn on the switching element SW via a switching signal S2 outputted from the output terminal Q_B. On the other hand, the flip-flop circuit 2 is reset by an ON-time signal S3 to turn off the switching element SW via a switching signal S2 outputted from the output terminal Q_B. The on-off control of the switching element SW is performed via the buffer circuit 4 having current drivability augmented by an inverter. The ON-time signal S3 is a pulse signal for defining an ON-time being a period of time during which the switching element SW is kept ON. The ON-time signal S3 is generated by the ON-time generation circuit 3. The ON-time may be of a preset value, or may be of a value based on the output voltage VOUT and the input voltage VIN.

The reference voltage generation circuit 10 has a first reference power supply V1 for generating a first reference voltage Vref1, a second reference power supply V2 for generating a second reference voltage Vref2 lower than the first reference voltage Vref1, a capacitor C1 having the positive electrode side connected to the noninverting input terminal of the comparator 1 so that its capacitor voltage becomes the reference voltage Vref, a resistor R1 connected between the first reference voltage Vref1 and the positive electrode side of the capacitor C1, and a main switch means SW1 connected between the second reference voltage Vref2 and the positive electrode side of the capacitor C1. The negative electrode side of the capacitor C1 is at a VCC (GND) potential, as are the negative sides of the first and second reference power supplies V1 and V2.

As a result, the reference voltage Vref when the switching element SW is in the ON-state is the second reference voltage Vref2 which is the capacitor voltage at this time. When, in such a state, the switch means SW1 enters the OFF-state, a current based on a potential difference between the first reference voltage Vref1 and the second reference voltage Vref2 flows into the capacitor C1 via the resistor R1. Consequently, the reference voltage Vref defined by the capacitor voltage is gradually increased from the second reference voltage Vref2 toward the first reference voltage Vref1 at a value defined by the resistance value of the resistor R1, the capacity of the capacitor C1, and a time constant. For this increase in voltage, the first reference voltage Vref1 becomes the upper limit of the reference voltage Vref. That is, the amplitude of the reference voltage Vref is uniquely defined between the second reference voltage Vref2 and the first reference voltage Vref1 by the time constant based on the resistance value of the resistor R1 and the capacity of the capacitor C1. The difference between the first reference voltage Vref1 and the second reference voltage Vref2 is preferably of the order of, for example, 5 mV to 20 mV.

In the above manner, the output voltage VOUT is obtained which is a predetermined direct current voltage smoothed by the capacitor CL via the coil L connected between the drain of the switching element SW and the free-wheeling diode D.

In the above-mentioned switching power supply circuit, when the switching signal S2 supplied from the output terminal Q_B of the flip-flop circuit 2 to the switching element SW via the buffer circuit 4 is at an L-level, the switching element SW enters the ON-state. Thus, the coil current ILx flowing through the coil L gradually increases.

When, in this state, the ON-time defined by the ON-time generation circuit 3 has passed, the flip-flop circuit 2 is reset by the ON-time signal 3 outputted from the ON-time generation circuit 3. As a result, the switching signal S2 supplied from the output terminal Q_B to the switching element SW via the buffer circuit 4 reaches an H-level, whereupon the switching element SW enters the OFF-state. Consequently, the coil current ILx gradually decreases while recirculating via the diode D.

As the coil current ILx decreases, the output voltage VOUT becomes less than the reference voltage Vref. At this time, the flip-flop circuit 2 is set, with the result that the switching element SW enters the ON-state. Consequently, the coil current ILx gradually increases again. Simultaneously, the management or control of the ON-time by the ON-time generation circuit 3 is started. Afterwards, the same actions are repeated.

The switch means SW1 of the reference voltage generation circuit 10 in the present embodiment is controlled to the same on-off state as is the switching element SW, in synchronization with the switching element SW. To realize such control, it is recommendable, for example, to compose the switch means SW1 of the same P-channel MOSFET as that for the switching element SW, and control this P-channel MOSFET by the switching signal S2, which is outputted from the output terminal Q_B of the flip-flop circuit 2, as is the switching element SW. The reason is that the switch means SW1 can be brought into the off-on state in a phase opposite to the phase of the on-off state of the switching element SW.

Figures 2A, 2B, 2C:
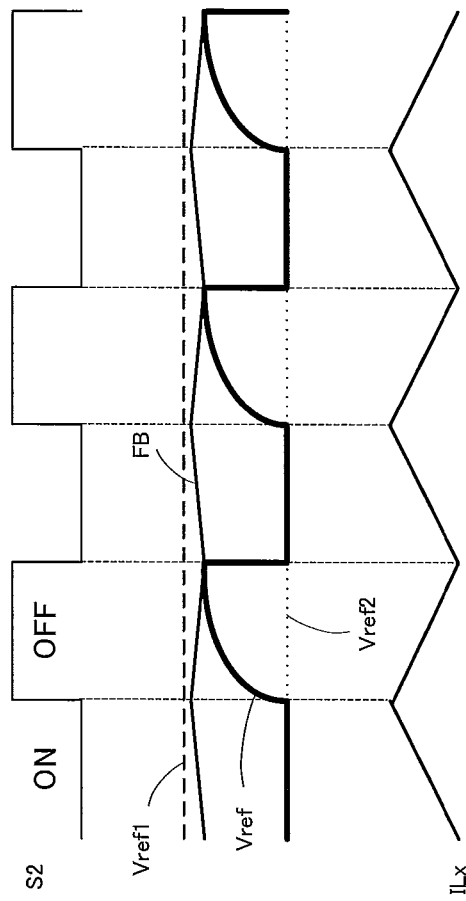
FIG. 2 is a wave form chart showing the signal waveforms of respective portions in FIG. 1 in a continuous mode of the switching power supply circuit according to the embodiment of the present invention.

The signal waveforms of the respective portions in a continuous mode of the switching power supply circuit according to the above-described present embodiment are shown in FIG. 2. During a period during which the switching signal S2 shown in FIG. 2A, is in the L-state, the switching element SW and the switch means SW1 are in the ON-state. During a period during which the switching signal S2 is in the H-state, the switching element SW and the switch means SW1 are in the OFF-state. As a result, the coil current ILx shown in FIG. 2C, becomes a current which gradually increases during the ON-period of the switching element SW, and gradually decreases during the OFF-period of the switching element SW.

The on-off status of the switching element SW is defined by a magnitudinous relation between the feedback voltage FB and the reference voltage Vref shown in FIG. 2B. That is, when the feedback voltage FB lowers beyond a predetermined threshold value with respect to the reference voltage Vref, the switching signal S2 falls to the L-level, whereby the switching element SW and the switch means SW1 enter the ON-state. As a result, the coil current ILx gradually increases, and this state is continued until the moment of outputting of the ON-time signal S3 serving as the reset signal for the flip-flop circuit 2, namely, until the moment when the ON-time elapses.

Upon the lapse of the ON-time and the entry of the switching element SW and the switch means SW1 into the OFF-state, the reference voltage Vref is gradually increased from the second reference voltage Vref2 toward the first reference voltage Vref1, in a waveform as shown in FIG. 2B, at a value defined by the resistance value of the resistor R1, the capacity of the capacitor C1, and the time constant. During this period, the coil current ILx is gradually decreased. As a result, even if the ripple component of the output voltage VOUT is small and the range of changes in the feedback voltage FB is narrow, a state equivalent to a state where they are sufficiently great can be created.

Thus, even if the ripple component of the output voltage VOUT becomes small by use of the smoothing capacitor CL with low ESR, or even if the slew rate of the ripple component of the output voltage VOUT becomes relatively low as a result of an increase in the switching frequency, a predetermined switching action can be performed stably.

Figures 3A, 3B, 3C:
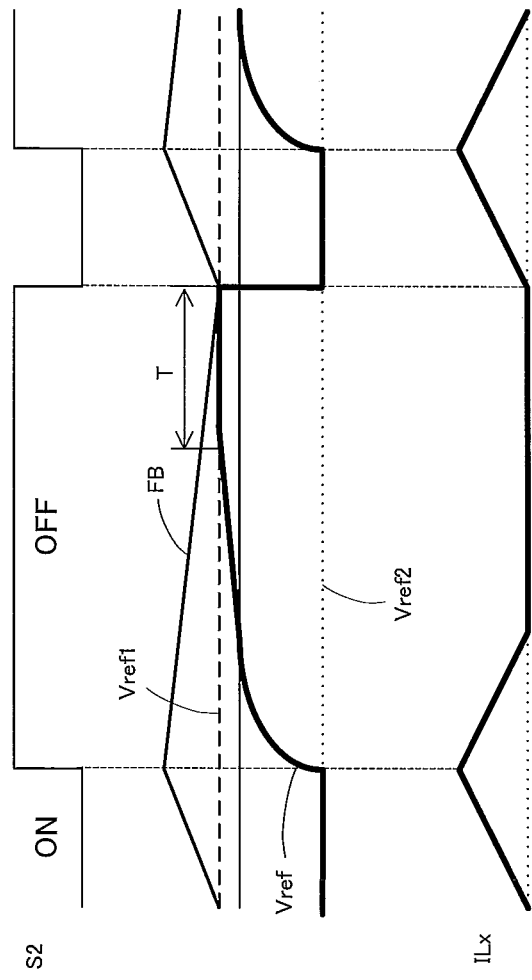
FIG. 3 is a waveform chart showing the signal waveforms of the respective portions in FIG. 1 in a discontinuous mode of the switching power supply circuit according to the embodiment of the present invention.

In a discontinuous mode as shown in FIG. 3, a period during which the coil current ILx is reduced to zero occurs in accordance with the on-off actions of the switching element SW and the switch means SW1 as shown in FIG. 3A. Even in this case, the basic mode of control is the same as that shown in FIG. 2. During the OFF-period of the switching element SW, however, the reference voltage Vref continues to increase gradually. If this situation remains unchanged, there is a concern about an abnormal increase in the output voltage VOUT. In the present embodiment, by contrast, the upper limit of the reference voltage Vref is defined by the first reference voltage Vref1. Thus, the reference voltage Vref stops increasing at a time when it reaches the first reference voltage Vref1, whereafter the reference voltage Vref remains to be the first reference voltage Vref1. In FIG. 3B, a period T is a period during which the reference voltage Vref is equal to the first reference voltage Vref1. As a result, even when the coil current ILx is discontinuous, the output voltage VOUT does not become abnormally high, and a direct current voltage adjusted to a value within a predetermined range can be supplied stably.

Figures 4A, 4B:
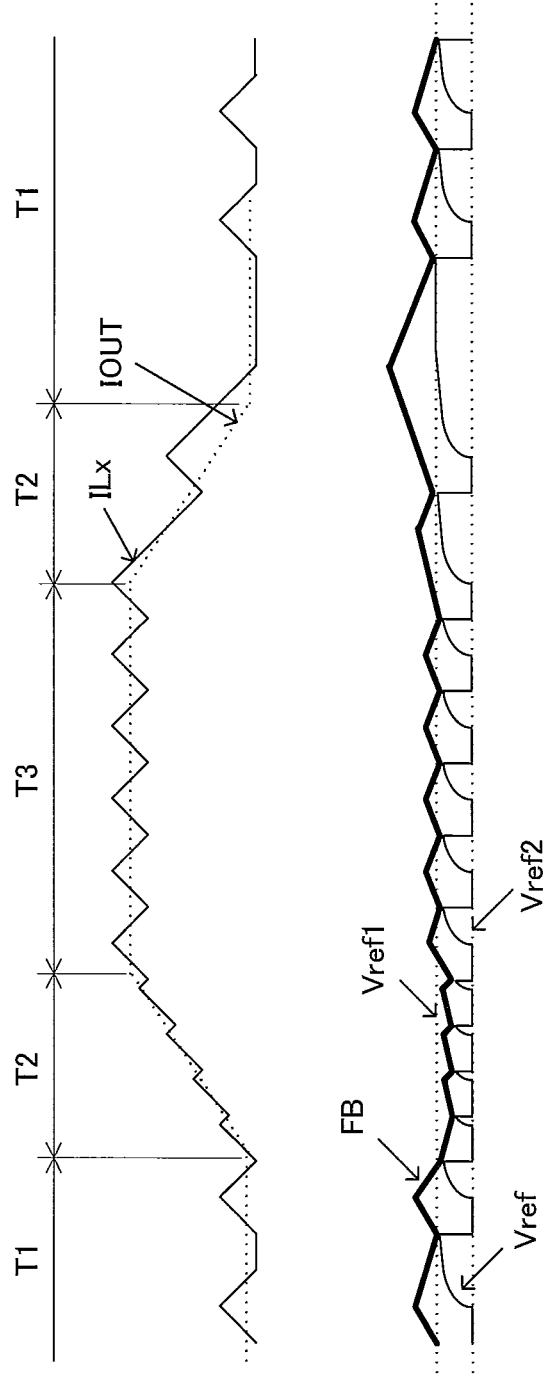
FIGS. 4A, 4B are waveform charts showing the relation between an example of the actual output current and the waveforms of the respective portions.

FIG. 4A is a waveform chart showing the actual coil current ILx and the output current IOUT associated therewith. FIG. 4B is a waveform chart showing the feedback voltage FB, the reference voltage Vref, the first reference voltage Vref1, and the second reference voltage Vref2 corresponding to the coil current ILx and the output current IOUT. In FIG. 4A, T1 denotes a discontinuous mode period, T2 denotes a transitional period, and T3 denotes a continuous mode period.

By reference to these drawings, it is seen that in any of the modes, a state equivalent to a state where the ripple component of the output voltage is sufficiently great is created, whereby predetermined switching control is performed, and that the reference voltage Vref is controlled to have the first reference voltage Vref1 as its upper limit in order to prevent an abnormal increase in the output voltage.

In the present invention, the switch means SW1 is not necessarily required to be controlled such that its OFF-state is started at the moment of start of the OFF-period of the switching element SW. The switch means SW1 may be controlled so as to be at least in the OFF-state, whereby the reference voltage Vref is gradually increased, during a period during which the switching element SW is in the OFF-state, namely, the period during which the coil current ILx is gradually decreased. Thus, the OFF-period of the switch means SW1 may be started within the period during which the switching element SW is in the ON-state. Even in this case, however, control needs to be exercised such that the reference voltage Vref is gradually increased during the OFF-period of the switching element SW.

FIG. 5 is a waveform chart showing the signal waveforms of the respective portions in FIG. 1 in a continuous mode according to other embodiment for exercising switching control of the above-mentioned switch means SW1. In the present embodiment as well, the switching element SW is controlled to be turned on or off by the switching signal S2 shown in FIG. 2A. That is, the switching signal S2 shown in FIG. 5A, and the coil current ILx shown in FIG. 5C, have the same waveforms as those of the switching signal S2 shown in FIG. 2A, and the coil current ILx shown in FIG. 2C.

As shown in FIG. 5D, according to the present embodiment, a switching signal S2' for turning the switch means SW1 on or off falls, and enters the L-state, at the moment of start of the L-state of the switching signal S2 (the ON-state of the switching element SW) shown in FIG. 5A. The switching signal S2' rises, and enters the H-state, after a lapse of a predetermined time within the period during which the switching signal S2 is in the L-state. Thus, the switch means SW1, which is controlled by the switching signal S2', has its OFF-state started halfway through the ON-period of the switching element SW, and continues to be in the OFF-state during the period during which the switching element SW is in the OFF-state, namely, the period during which the coil current ILx is gradually decreased.

As a result, control is exercised such that the switch means SW1 has its OFF-state started, and the reference voltage Vref is gradually increased, halfway through the ON-period of the switching element SW, as shown in FIG. 5B.

FIG. 6, like FIG. 5, is a waveform chart showing the signal waveforms of the respective portions in FIG. 1 in a discontinuous mode according to the other embodiment for exercising switching control of the switch means SW1. In the present embodiment as well, the switching element SW is controlled to be turned on or off by the switching signal S2 shown in FIG. 3A. That is, the switching signal S2 shown in FIG. 6A, and the coil current ILx shown in FIG. 6C, have the same waveforms as those of the switching signal S2 shown in FIG. 3A, and the coil current ILx shown in FIG. 3C.

As shown in FIG. 6D, according to the present embodiment, the switching signal S2' for turning the switch means SW1 on or off falls, and enters the L-state, at the moment of start of the L-state of the switching signal S2 (the ON-state of the switching element SW) shown in FIG. 6A. The switching signal S2' rises, and enters the H-state, after a lapse of a predetermined time within the period during which the switching signal S2 is in the L-state. Thus, the basic mode of switching control is the same as that shown in FIG. 5.

It is to be noted in the case shown in FIG. 6, however, that the reference voltage Vref, which continues to gradually increase during the OFF-period of the switching element SW, has its upper limit defined by the first reference voltage Vref1. Thus, control is exercised such that the reference voltage Vref stops increasing at a time when it reaches the first reference voltage Vref1, whereafter the reference voltage Vref is maintained at the first reference voltage Vref1. In FIG. 6B, a period T is a period during which the reference voltage Vref is equal to the first reference voltage Vref1. As a result, even in the discontinuous mode, the output voltage VOUT does not become abnormally high, as in the case shown in FIG. 3, and a direct current voltage adjusted to a value within a predetermined range can be supplied stably.

In performing the on-off control of the switching element SW and that of the switch means SW1 in synchronism as in the case shown in FIG. 2, the switching signal S2 used for the on-off control of the switching element SW can be used unchanged as the switching signal S2' for the switch means SW1. Including this advantage, the present embodiment has the effect that predetermined switching control can be performed conveniently and appropriately.

Figure 8:
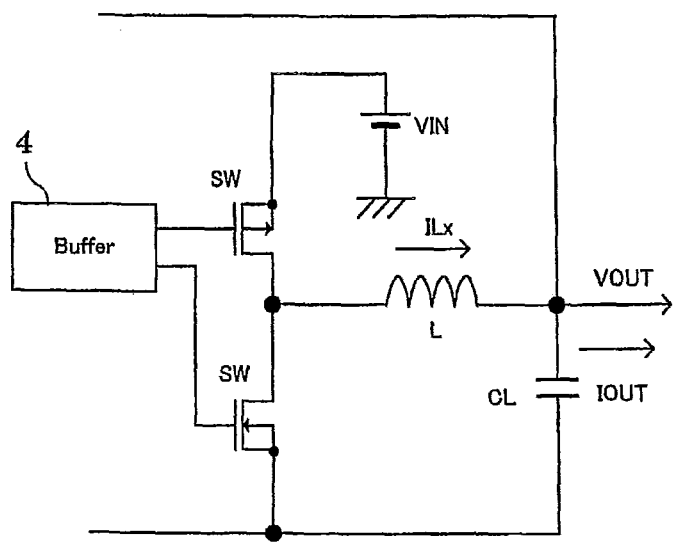
FIG. 8 is a block diagram showing a switching power supply circuit according to an embodiment of the present invention.

Furthermore, the switching power supply circuit is not limited to the mode of the above embodiments in which the coil current ILx during the OFF-period of the switching element SW is bypassed or recirculated via the diode D. As shown in FIG. 8, the switching power supply circuit may be in a synchronous rectification mode in which the switching element SW is adopted as a main switching element, a subordinate switching element is provided in addition, and the main switching element and the subordinate switching element are alternately turned on and off to adjust the output voltage VOUT to a predetermined level.

The invention claimed is:

1. A switching power supply circuit including a switching element and a free-wheeling element and adapted to turn on or off at least the switching element, thereby converting a direct current input voltage into a direct current output voltage, comprising:
    a comparator for comparing a reference voltage, which is an output signal of a reference voltage generation circuit, with a feedback voltage based on the output voltage, and outputting a set signal when a difference between the reference voltage and the feedback voltage exceeds a predetermined threshold value;
    an ON-time generation circuit for generating an ON-time signal being a pulse signal for defining a period of time during which the switching element is kept ON; and
    a flip-flop circuit which is set by the set signal to bring the switching element into an ON-state or an OFF-state, and is reset by the ON-time signal to bring the switching element into an OFF-state or an ON-state, and
    wherein the reference voltage generation circuit has a first reference power supply for generating a first reference voltage, a second reference power supply for generating a second reference voltage lower than the first reference voltage, a capacitor having one electrode side connected to one input terminal of the comparator so that a capacitor voltage thereof becomes the reference voltage, a resistor connected between the first reference power supply and the one electrode side of the capacitor, and switch means connected between the second reference power supply and the one electrode side of the capacitor, and the reference voltage generation circuit is controlled such that at least during an OFF-period of the switching element, the switch means is brought into an OFF-state, and the reference voltage is gradually increased.

2. The switching power supply circuit according to claim 1, wherein the switch means is controlled so as to be turned on or off in synchronization with turning-on or turning-off of the switching element.

3. The switching power supply circuit according to claim 1, wherein the switch means is controlled so as to be turned on simultaneously with turning-on of the switching element and be turned off a predetermined period of time after the turning-on of the switching element.

4. The switching power supply circuit according to claim 1, further comprising the switching element, and a free-wheeling diode for flowing an electric current when the switching element is in the OFF-state.

5. The switching power supply circuit according to claim 1, further comprising a main switching element and a subordinate switching element, and adapted to exercise switching control in a synchronous rectification mode for alternately turning on and off the main switching element and the subordinate switching element according to an output of the flip-flop circuit.

* * * * *